United States Patent [19]

Etchells et al.

[11] Patent Number: 4,886,086
[45] Date of Patent: Dec. 12, 1989

[54] NON-DEGRADING PRESSURE REGULATOR

[75] Inventors: Arthur W. Etchells, Philadelphia, Pa.; David J. Donofrio, Wilmington, Del.

[73] Assignee: Graco, Inc., Minneapolis, Minn.

[21] Appl. No.: 136,982

[22] Filed: Dec. 23, 1987

[51] Int. Cl.⁴ .............................................. B05C 11/10
[52] U.S. Cl. ........................................ 137/1; 137/563; 138/40; 138/44; 239/124
[58] Field of Search ...................... 137/1, 563; 138/40, 138/44; 239/124, 126

[56] References Cited

U.S. PATENT DOCUMENTS

| 67,614 | 8/1867 | Trees | 138/40 X |
|---|---|---|---|
| 2,022,481 | 11/1935 | Schellenger | 137/563 |
| 2,244,686 | 6/1941 | Garrison et al. | 137/563 X |
| 4,031,913 | 6/1977 | Apellauiz | 138/44 X |
| 4,390,126 | 6/1983 | Buchholz et al. | 137/563 X |
| 4,484,472 | 11/1984 | Licinit et al. | 138/40 X |
| 4,522,058 | 6/1985 | Ewing | 138/44 X |
| 4,576,204 | 3/1986 | Smallhorn et al. | 138/40 X |
| 4,653,532 | 3/1987 | Powers | 137/563 |
| 4,706,885 | 11/1987 | Morin | 239/124 X |

FOREIGN PATENT DOCUMENTS 2060937 5/1981 United Kingdom .................. 138/40

*Primary Examiner*—John Rivell
*Attorney, Agent, or Firm*—Douglas B. Farrow

[57] ABSTRACT

A fluid pressure regulator for metallic flake pigment and other potentially degradable paints is provided by utilizing an orifice of such cross-section, shape and length so as to provide the desired pressure drop while at the same time maintaining flow in the laminar regime through the regulator.

16 Claims, 1 Drawing Sheet

U.S. Patent
Dec. 12, 1989
4,886,086
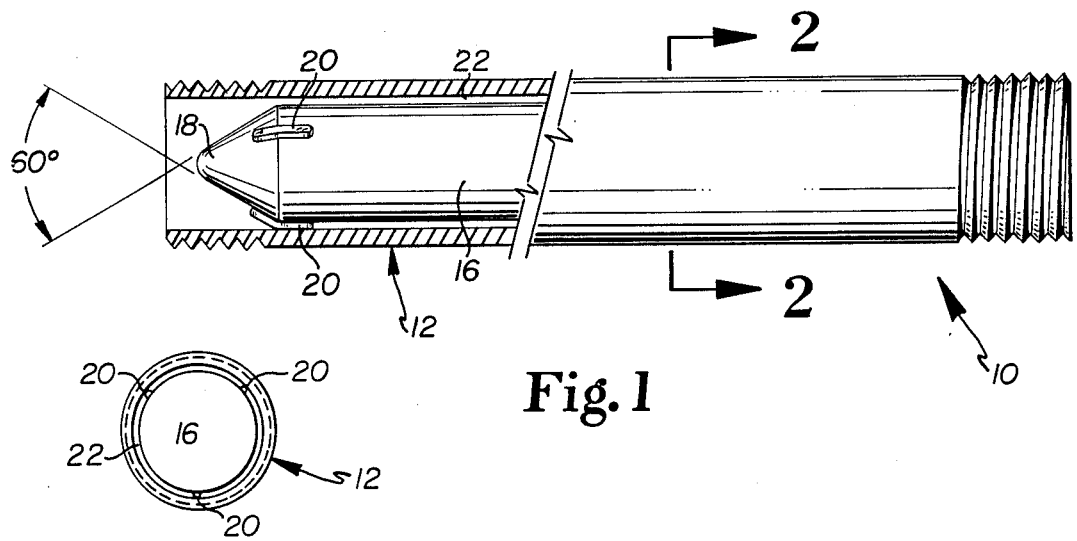
Fig. 1
Fig. 2
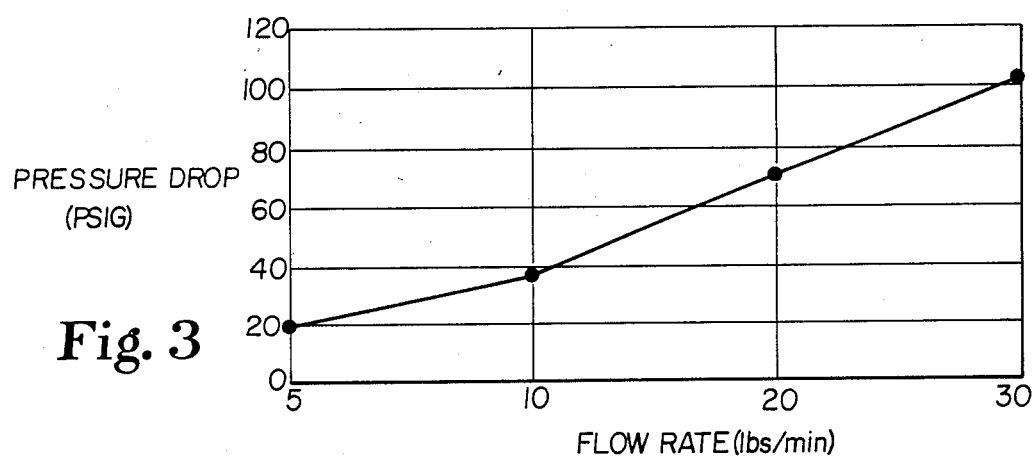
Fig. 3
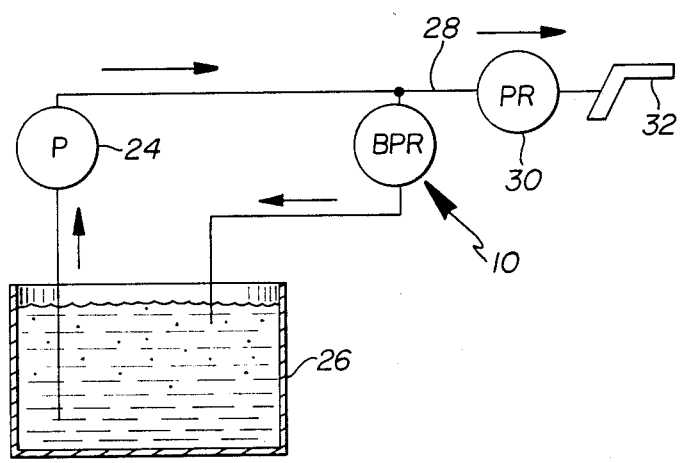
Fig. 4

NON-DEGRADING PRESSURE REGULATOR

BACKGROUND OF THE INVENTION

Pressure regulators are in general well-known and most times are an integral and required part of any fluid distribution and pumping system. In particular, fluid circulating systems which circulate fluid under pressure and return unused fluid to a reservoir generally require the inclusion of a back pressure regulator to maintain the desired pressure in the circulating system. Such circulating systems are in general well-known and in widespread use.

One such use to which such systems are put is in circulating paint or other coating materials in industrial environments such as automobile manufacturing facilities. It is particularly important that the paint in such facilities be maintained in constant circulation and agitation so that the solids suspended in the paint are maintained in a homogenous mixture. Further, it is important particularly for metallic paints that the metallic flakes present in the paints be treated as gently as possible so as to prevent damage to the flakes and resulting change in the appearance of the paint.

It has been discovered that one of the primary contributors to paint degradation particularly of metallic flake pigments, is the back pressure regulator which is present in most circulating systems. It is therefore an object of this invention to provide a back pressure regulator which is capable of regulating pressure to desired levels and yet which does not provide degradation of metallic and other similarly fragile paints and like materials. It is further an object of this invention that such a regulator be easily and inexpensively manufactured as well as easily integrated into a system. It is yet another object of this invention to provide a regulator which is easily flushed.

SUMMARY OF THE INVENTION

It has been discovered that by maintaining paint in a laminar flow condition, paint and flake degradation is drastically reduced if not totally eliminated. The instant invention therefore aims to provide a regulator which maintains the paint in the laminar flow regime while at the same time providing the desired pressure drop through the regulator. Towards this end, an orifice is provided which has such a shape, diameter and length as to maintain laminar flow. In particular, this is accomplished with a piece of pipe or other conduit having a solid body located concentrically therewith, leaving a thin annular opening between the conduit and the body. The ends of the solid body are suitably rounded so as to provide a smooth transition into the annular opening, thereby encouraging laminar flow and yet providing the desired pressure drop. The pressure drop, within limits, may be varied by changing the length of the body or by varying the annular spacing between the two parts of the instant invention.

Of course, it should be recognized that other orifice configurations may be utilized to achieve the same result. For instance, flow may be directed between a pair of parallel plates having a gap, width and length sufficient to maintain the desired pressure drop and laminar flow.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a partially cut-away, longitudinally cut-away view showing the pressure regulator of the instant invention.

FIG. 2 is a sectional view taken along Line 2—2 of FIG. 1.

FIG. 3 shows the pressure drop/flow characteristics of the instant invention.

FIG. 4 shows a schematic of a paint circulating system in which the instant invention is utilized.

DESCRIPTION OF THE PREFERRED EMBODIMENT

The device of the instant invention 10 is comprised generally of an elongated conduit or passageway which may be formed out of a piece of pipe 12 having an inside diameter 14. Located inside pipe 12 is a solid body which may be formed of a thick piece of rod 16 which has both ends 18 formed to a rounded point. The rod 16 is located within the pipe 12 by means of three small pins 20 which equally space the rod from the inside diameter of the pipe to form an annular opening there between. The shape of either end 18 of the rod is such as to promote a gentle transition into the annular orifice 22. The orifice 22 has inside and outside diameters and a length such as to promote laminar flow therein.

An example of the instant invention has been designed for use with a paint having a viscosity of approximately 75 centipoise. The design of the example is engineered to provide the pressure drop characteristics shown in FIG. 3. In this example, the pipe 12 has a nominal inside diameter of 0.824 inches and the rod has an outside diameter of 0.742 inches. This provides an annulus or orifice thickness 22 of approximately 0.041 inches. These figures are relatively critical and should be closely maintained for best results. In order to maintain the desired pressure drop, the length of the full diameter rod is 12 inches with the tapers on either end 18 being approximately one-half inch each in length. This construction yields an efficient yet easily manufactured pressure regulator which provides vastly improved results over traditional designs.

In general, for designing a pressure regulator according to the instant invention, laminar flow is desired. Laminar flow is characterized by a Reynolds number (RE) which occurs at less than 1,000 but preferably less than 200. The Reynolds number is defined as follows:

$$RE = gVd/v$$

where:
 d = density of fluid
 g = gap of device
 V = velocity of fluid in gap
 v = viscosity of the fluid In general, the length of the device or the length of the gap must be at least ten gap-widths long, which leads to the equation L is greater than 10 g where L = length of device. The pressure drop resulting from such a device can be characterized by the following equation:

$$DP = KvQL/D/g^3$$

where:

DP = pressure drop
D = diameter of device of the gap or width of gap
K = a dimensionless constant for the particular device
Q = volumetric flow rate through the device.

Such equations apply to any annular or flat plate type device and it is preferred that the device have relatively small gaps and relatively long lengths.

Viscosity and density are characteristics of the fluid being pumped and flow rate is normally defined by the system in which the regulator will be used. Thus, for a fixed gap and length, the flow and pressure drop are directly proportional. This general relationship can be seen in FIG. 3. In order to provide an adjustable pressure drop, either the length of the device or the gap must be varied.

A general schematic of a typical circulating system is shown in FIG. 4. In that system, the intake of a pump 24 is connected to a reservoir 26 containing a paint or other fluid to be pumped. The output of pump 24 is fed around a loop to the back pressure regulator 10 of the instant invention, the output of which returns to reservoir 26. Between pump 24 and back pressure regulator 10 one or more take-offs 28 may be provided which are in turn connected to a pressure regulator 30 which directly controls the pressure for a particular application device 32 which may be a spray gun or the like.

It is contemplated that various changes and modifications may be made to the NON-DEGRADING PRESSURE REGULATOR without departing from the spirit and scope of the invention as defined by the following claims.

What is claimed is:

1. A pressure regulator in combination with a material supply system having a reservoir and a pump and containing materials which degrade in turbulent flow, said pressure regulator comprising an orifice having such shape, cross-sectional area and length so as to produce a predetermined pressure drop for a given material at a given flow rate while maintaining flow through the regulator in the laminar regime at all times in order to prevent degradation of said degradable materials.

2. The pressure regulator of claim 1 wherein said regulator is placed in a fluid conduit, said orifice being formed by a restricting member located in said conduit, the space between said member and said conduit constituting said orifice.

3. The pressure regulator of claim 2 wherein said member has gently rounded ends so as to maintain laminar flow during transition to and from said regulator.

4. The combination of claim 1 wherein said material is a paint.

5. The combination of claim 4 wherein said paint is a metallic paint.

6. A coating material circulation system having a predetermined range of flow rates and comprising:

a material to be circulated through said system, said material having a density and a viscosity and being susceptible to degradation;
a reservoir containing said material;
a circulating loop;
a pump, said pump withdrawing material from said reservoir and pressurizing said loop;
at least one takeoff connected to an application device; and
a pressure regulator connected between said loop and said reservoir, said regulator having an orifice gap, length and shape such that the Reynolds number (RE) is less than 1000, where $$RE = gVd/v$$

where:
d = said material density
g = orifice gap
V = material velocity in the gap
v = material viscosity
and where said orifice length for flow rates in said predetermined range is greater than 10 g, whereby laminar flow if maintained and material degradation is prevented.

7. The system of claim 6 wherein RE is less than 200.

8. The coating material circulation system of claim 6 wherein said material is a paint.

9. The coating material circulation system of claim 8 wherein said paint is a metallic paint.

10. A method of regulating the pressure of a degradeable fluid material having a density, flow rate and viscosity without causing undue degradation and comprising the steps of:

passing the fluid through an orifice having a gap and a length; and
maintaining the flow through said orifice in the laminar regime at all times in order to prevent degradation of said degradable materials.

11. The method of claim 10 whereby said flow through said orifice has a Reynolds number of less than 200.

12. The method of claim 11 wherein gap is variable to regulate pressure.

13. The method of claim 11 wherein said length is variable to regulate pressure.

14. The method of claim 11 wherein $RE = gVd/v$ where:
g = said gap
V = fluid velocity through said gap
d = said fluid density
v = said fluid viscosity.

15. The method of claim 10 wherein said material is a paint.

16. The method of claim 15 wherein said paint is a metallic paint.

* * * * *